United States Patent [19]

Trulio et al.

[11] 4,103,756
[45] Aug. 1, 1978

[54] STRESS WAVE GENERATOR

[75] Inventors: John G. Trulio, Los Angeles, Calif.; Stephan J. Bless, Dayton, Ohio

[73] Assignee: Applied Theory, Inc., Los Angeles, Calif.

[21] Appl. No.: 745,081

[22] Filed: Dec. 21, 1976

[51] Int. Cl.² ............................................... G01V 1/14
[52] U.S. Cl. ............................ 181/121; 340/15.5 SW; 181/106; 181/401; 175/1
[58] Field of Search ............... 340/15.5 SW, 15.5 AC, 340/18 NC; 181/104, 106, 121, 401; 73/88 C; 175/1, 50; 166/177

[56] References Cited

U.S. PATENT DOCUMENTS

| 1,989,906 | 2/1935 | Beck | 175/302 |
|---|---|---|---|
| 2,740,489 | 4/1956 | White et al. | 340/15.5 TC |
| 3,061,037 | 10/1962 | Evans | 340/15.5 SW |
| 3,600,938 | 8/1971 | Wappall et al. | 73/88 C |
| 4,050,540 | 9/1977 | Cholet et al. | 181/121 |

Primary Examiner—Nelson Moskowitz

Attorney, Agent, or Firm—Louis J. Bachand

[57] ABSTRACT

Method and apparatus are provided for generating in situ in a zone of earth surrounding a bore hole both longitudinal and shear waves and of predetermined relative amplitude, entirely mechanically, avoiding use of explosives, and with relatively low power requirements for the stress waves generated. Subterranean impacts generating high amplitude stress waves equivalent to those generated by fifteen pounds of TNT or multiples of such quantities of TNT are realized. These high amplitude waves are produced in an annular zone ten feet or more from the earth bore, where the earth specimen has not been previously disturbed and its measured properties are therefore truly representative of the medium. In addition to being a non-explosive earth stress wave generator, the present device, and method herein, enables controllable variation in the amplitude of the shear wave relative to the longitudinal wave and vice versa by control of operating parameters using the same equipment, including rate of rotation, travel distance and mass/area relationship.

34 Claims, 12 Drawing Figures

—UNDISTURBED—

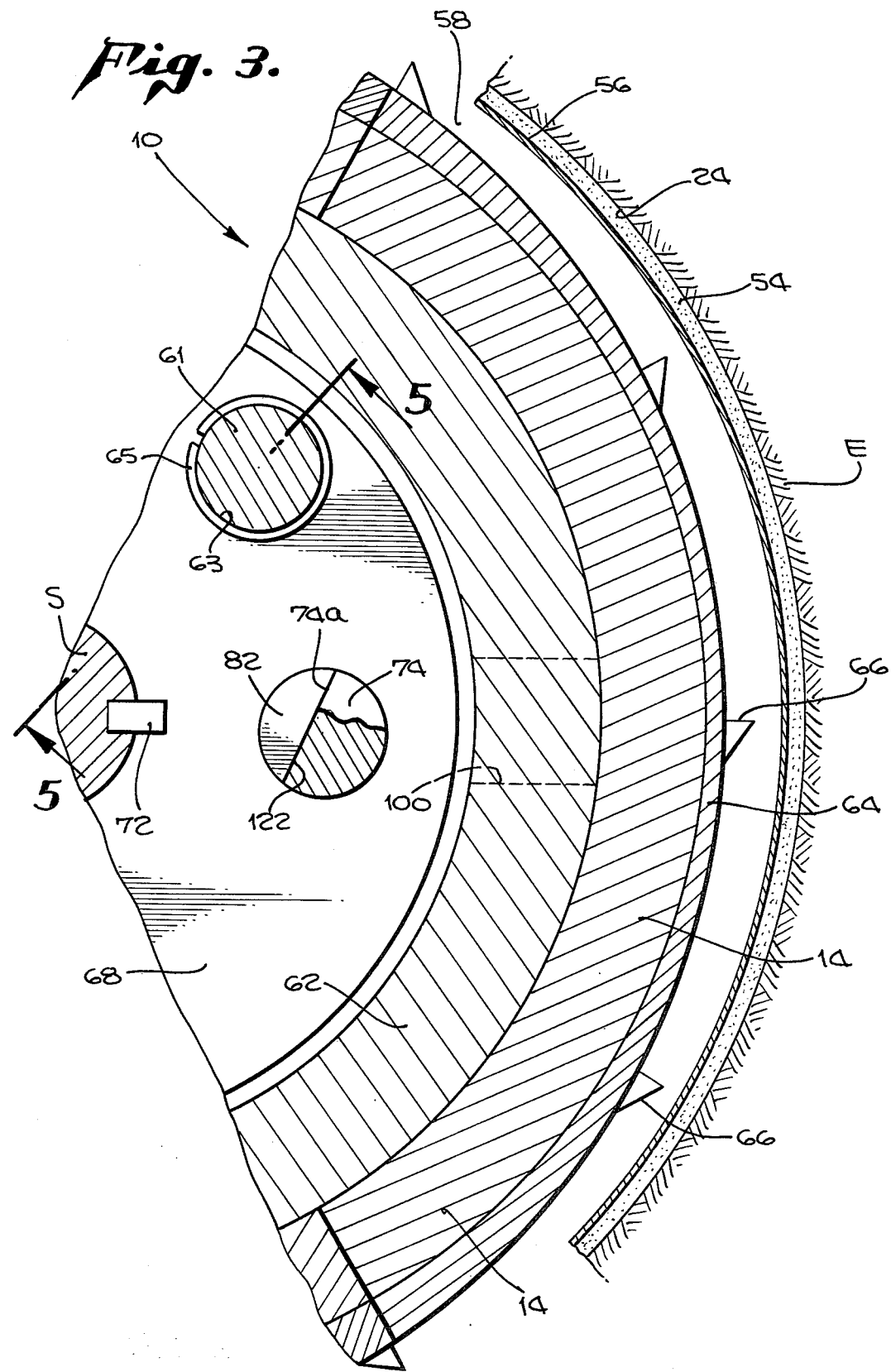

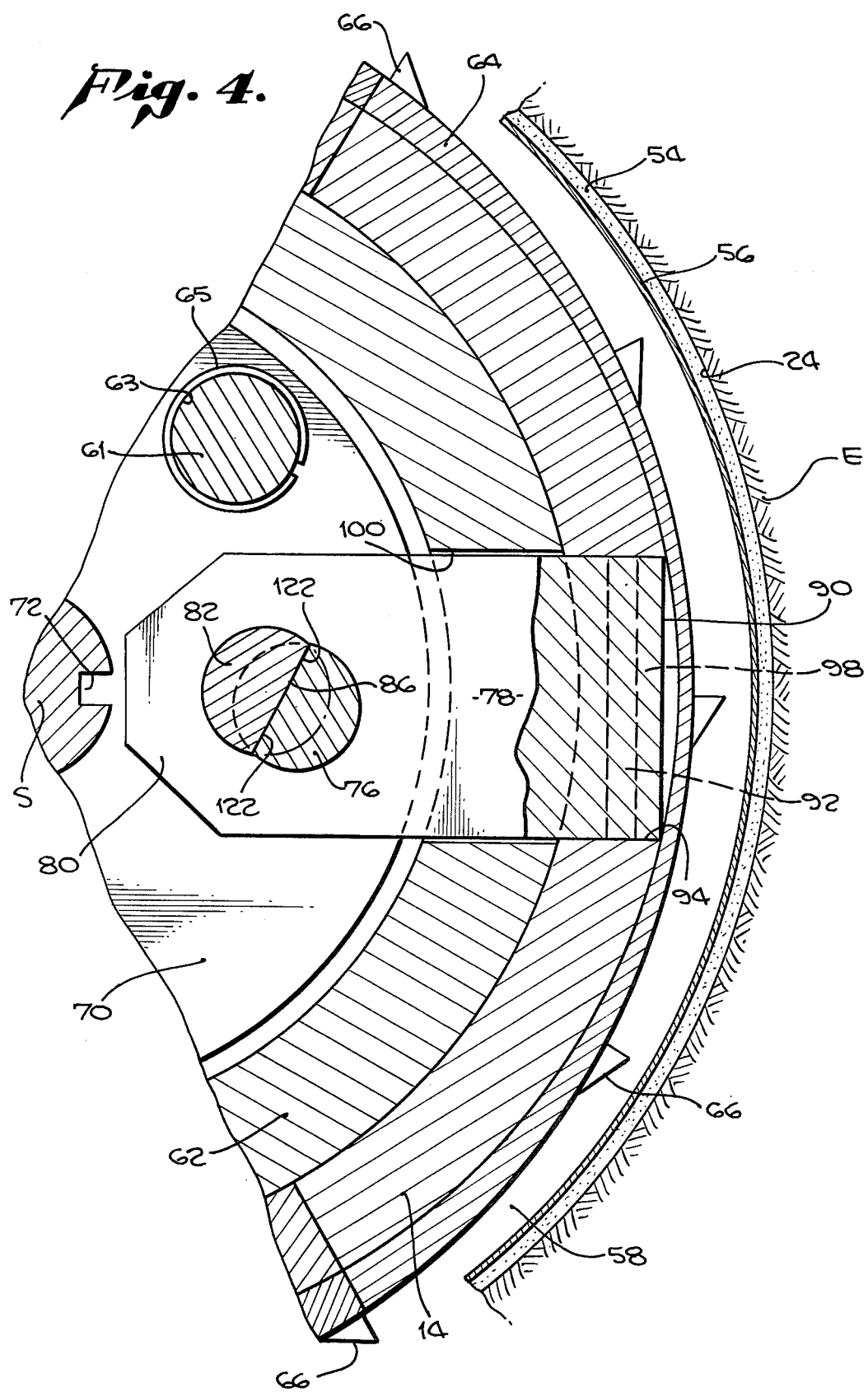

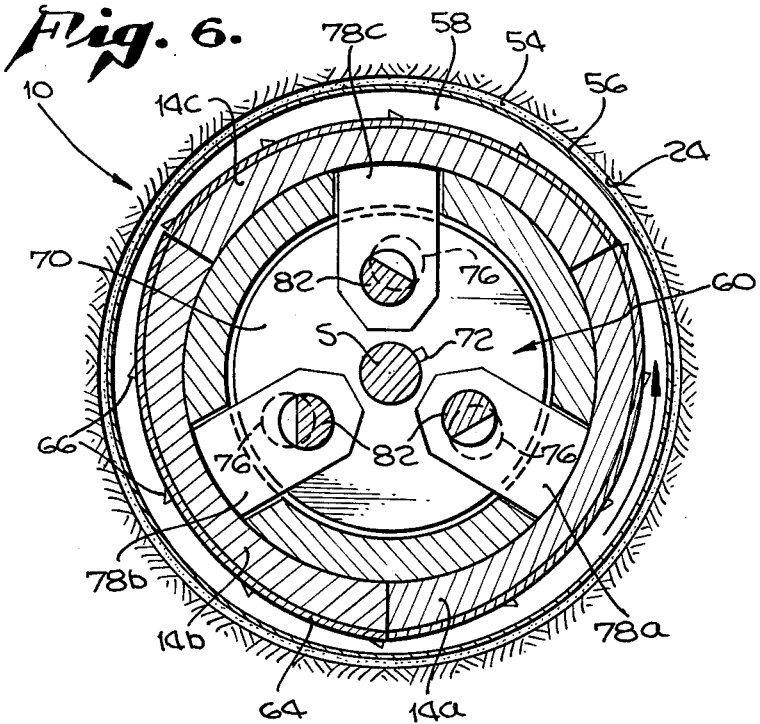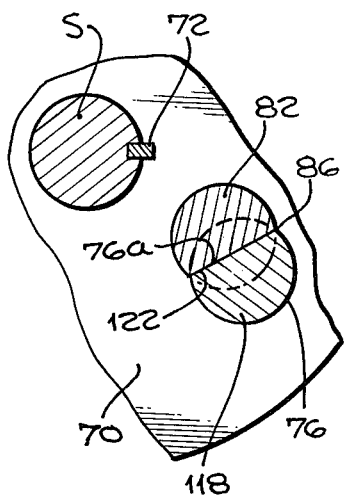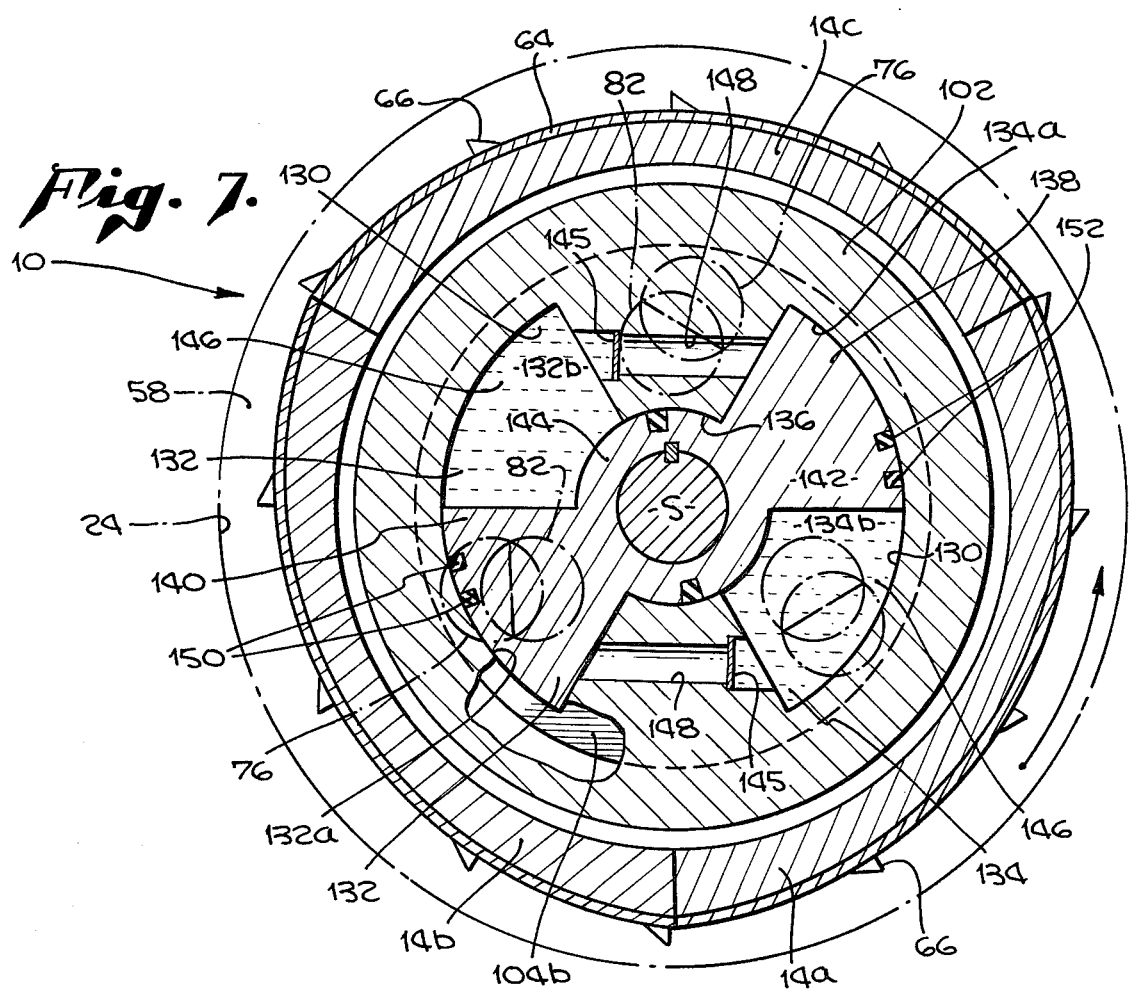

STRESS WAVE GENERATOR

BACKGROUND OF THE INVENTION

This invention has to do with stress wave generation in the earth and more particularly is concerned with method and apparatus for the controllable non-explosive generation of longitudinal and shear stress waves in an earth zone surrounding a bore hole.

The strength characteristics of the earth surface layer are of interest in determining suitability of various sites for construction and for like decisions premised upon seismic considerations. Additionally, the geological features of the earth are of interest from a minerals exploration point of view, and for these purposes it has been the practice to evaluate samples of the earth drawn from locations of interest for a wide variety of strength properties and similarly, to conduct seismic tests over relatively larger portions of the earth surface to detect subsurface location of e.g. oil sands.

The measurement of earth properties by obtaining and removing a sample from the earth to a laboratory for a variety of tests requires in decision making a number of assumptions concerning the relationships of the test data to the actual on-site properties, which of course are altered by removal of the sample from the earth. The conduct of on-site earth property evaluations has been hampered by the lack of equipment suited for on-site generation of the stresses necessary to measure properties of interest. Heretofore, stress generators have primarily been laboratory instruments. On-site generation of stress waves is practiced in a variety of instances, but has heretofore generally required the use of explosive devices such as packages of TNT, if stress waves of sufficient strength and intensity over large enough distances to insure typical medium response were to be obtained. Subsurface explosive tests are disfavored from an environmental point of view, further encumbering the earth testing process.

Additionally, explosively generated stress waves are essentially longitudinal in nature by virtue of the explosive characteristic, although frequently the property of interest in the earth is a property related to its performance in shear. For this purpose, shear stress waves are needed, and again resort must be had to the laboratory scale of equipment to obtain shear stress waves, and thus shear data, with respect to an earth sample. Again, the benefits of on-site testing are lost.

PRIOR ART

While a number of devices have been proposed, primarily for laboratory effort, as noted, there is not presently known a non-explosive mechanical stress wave generator for in situ generation of stress waves in the earth.

SUMMARY OF THE INVENTION

It is accordingly an object of the present invention to provide a mechanical earth stress wave generator. It is a further object to provide such a stress wave generator which provides both longitudinal and shear waves for earth property evaluation. It is a further object of the invention to provide such an earth stress wave generator which enables control of the relative amplitudes of the longitudinal wave and the shear wave, and all on site. It is a still further object of the invention to provide a method and apparatus for nonexplosively generating both longitudinal and shear waves beneath the earth's surface and in relatively proportionable amplitudes by relatively easy variations of the operating parameters of the device, and with basically the same device being used for differing amplitudes relatively of longitudinal and shear waves. It is a particular object of the invention to provide a generally cylindrical device which may be carried on a shaft in a bore hole for rotation at a selected speed and at a predetermined distance from the inner periphery of the bore hole for ultimately angular impact against the bore hole periphery in momentum-arresting relation to generate both shear and longitudinal stress waves at amplitudes relative to each other which are controllable by varying the rotational speed and the space between the device locus of rotation and the bore inner periphery and the element areal mass relation, herein termed "areal mass." It is still another object to provide a means for the geologic evaluation of the earth, particularly sensitive to the location of bodies, e.g. oil sands, that poorly propagate shear waves.

These and other objects of the invention are achieved in accordance with the teachings herein in an apparatus for generating in situ in a zone of earth surrounding a bore hole longitudinal and shear waves of predetermined relative amplitude, the apparatus comprising a striker having plural mass elements collectively rotatable at a selected speed within a locus of rotation coaxial with the bore and inward from the bore inner periphery to define a mass element travel space predetermined in relation to the selected rotational speed; the mass elements being individually separable from the striker rotation locus to travel through the space in timed response to striker rotation at selected speeds and angularly impact the periphery in circularly distributed dragging relation, generating longitudinal and shear waves having determined relative amplitudes responsive to the relation of travel space, rotational speed and element areal mass.

Specific features of this embodiment include the striker comprising a cylinder coaxial with the bore hole, the cylinder being longitudinally segmented to define the mass elements; a shaft extending within the rotation locus supporting the striker in driving relation; provision of means responsive to centrifugal force at the selected speed to separate the mass elements from the locus for bore inner periphery impact; the provision of bore hole liner means circumferentially enclosing the striker in spaced relation and uniformly defining the mass element travel space thereby, for simultaneous element impact; provision of surface projections carried by the mass elements for bore inner periphery engagement, in drag-enhancing relation; support of the mass elements on a common shaft and independent from their adjacent elements; provision of a guide ring maintaining the relative angular orientation of the segments during travel through the space between the locus of rotation and the inner periphery of the bore hole; and the provision of an earth surface-located prime mover coupled to the striker in rotationally driving relation.

In a more particularly preferred embodiment of the apparatus, there is provided, also for generating in situ in a zone of earth surrounding a bore hole, both longitudinal and shear waves and of a predetermined relative amplitude, the apparatus comprising a striker having plural, separable, longitudinal segments; and coupler structure coupling the segments for rotation collectively at a selected speed within a reduced locus of rotation (i.e. reduced in diameter relative to the bore diameter) coaxial with the bore defining a segment travel space between the locus and the bore inner periphery, the space being predetermined in relation to the selected rotational speed; the coupler structure including means releasing the segments in timed relation to striker rotation at the selected speed, and each along an individual path angularly outward through the space to compressionally compact the bore inner periphery in circularly distributed dragging relation, to generate longitudinal and shear waves having determined relative amplitudes responsive to the relation of travel space, rotational speed and segment areal mass.

In the first mentioned embodiment, there is further contemplated provision of a shaft extending along the locus axis of rotation, the coupler structure coupling the segments to the shaft for rotation; the striker comprising a cylinder symmetrically longitudinally segmented to define uniformly sized segments, the segments typically being peripherally transversely arcuate; provision of projections carried by the segments outward in drag-enhancing relation; provision of a segment guide maintaining the relative angular orientation of the segments during their travel angularly outward through the space provided.

It is particularly preferred to provide a coupler structure which comprises a selectively openable lock assembly locking the striker segments to the shaft, and including also in the apparatus clutch means acting on the lock assembly in centrifugal force responsive relation to open the lock assembly and release the striker segments. Thus, the lock assembly may include a first pin movable in a fixed circular path about the shaft and a second pin movable in a circular path and a sequentially curvilinear path with a striker segment; the first and second pins having selectively releasable interengagement controlling separation of the segment from the shaft. The mentioned clutch means may be hydromechanical and comprise a clutch rotor structure fixed to the shaft and a clutch collar, the rotor structure being selectively rotatable relative to the collar between first and second angular orientations to block or unblock respectively opening of the lock assembly in response to centrifugal force sensed at the speed of rotation selected. The mentioned clutch structure may include a rotor element fixed to the shaft and a captive fluid reservoir, between the rotor element and the clutch collar, said reservoir fluid being selectively displaceable responsive to centrifugal force pressurization, in rotor element and clutch collar relative angular orientation controlling relation. The fluid reservoir is typically located between the clutch rotor element and the clutch collar. Accordingly, means may be further provided releasing the captive fluid from the reservoir, the fluid release means being responsive to centrifugal force pressurization of the fluid, by the rotation of the apparatus. The fluid release means may comprise a frangible wall in pressure sensing relation to the fluid and rupturing responsive to sensing the centrifugal force pressurization of the fluid at the selected rotational speed, to free the fluid, releasing the pins, otherwise locked, from their interengagement, and the striker segments thereby for travel through the space, with the clutch collar then driving the clutch rotor element in its second, displaced angular orientation.

With reference to the pins mentioned, they may have circular motion about the shaft and be circularly separable to disengage responsive to angular reorientation of the clutch rotor element to the second angular orientation relative to the clutch collar. The pins may be paraxial with each other and with the shaft and have planetary motion about the shaft, the pins then being radially separable to disengage responsive to the mentioned reorientation of the clutch rotor element and collar. In a particularly preferred embodiment, the first and second pins are radially and vertically offset and the apparatus includes respectively opposed chordal flats formed on the pins to define their mutual interengagement surfaces, the pins having relative movement upon alinement of their interengagement surfaces in a radial plane relative to the shaft, the pins tending to aline their interengagement surfaces along said radial plane responsive to striker rotation and upon angular reorientation of the clutch rotor element to the second angular orientation thereof relative to the clutch collar. With reference to the clutch rotor structure in such an embodiment, there may be provided a rotor element fixed to the shaft and a captive fluid reservoir between the rotor element and the clutch collar, the reservoir fluid being selectively displaceable responsive to centrifugal force pressurization in rotor element and clutch collar relative angular orientation controlling relation, to enable pin alinement with their interengagement surfaces lying along said radial plane. In this embodiment there may likewise be provided means releasing the captive fluid from the reservoir, the fluid release means being responsive to centrifugal force pressurization of the fluid. Again, the fluid release means in this embodiment may comprise a frangible reservoir wall in pressure sensing relation to the fluid and rupturing responsive to sensing increased fluid pressure at the selected rotational speed, to free the fluid, unblocking the pins to rotate on their own axes to aline their mutual interengagement flats in a radial plane relative to the shaft, releasing the pins, otherwise locked, from their interengagement, and the striker segments thereby for travel through the space to the bore inner periphery.

In any of the above embodiments, there may be provided circular series of first and second pins and accompanying striker segments in stacked array, the pins and segments being jointly responsive to the clutch means reorienting operation. Accordingly, the striker may comprise a vertical series of cylinders, each symmetrically longitudinally segmented in common planes to define circularly arranged vertical stacks of symmetrical striker segments; and the apparatus then may include also a corresponding vertical series of segment guide rings maintaining the relative angular orientation of the segments during their travel angularly outward through the space. There may further be provided a surface distributed series of projections on the striker elements in drag enhancing relation. In a highly specific form, the invention comprises apparatus for generating in situ in a zone of earth surrounding a bore hole longitudinal and shear waves of predetermined relative amplitude, the apparatus comprising a bore coaxial shaft, a vertical series of strikers, each said striker having plural, like, separable, longitudinal segments; segment guide means receiving segment portions in radially sliding relation; coupler structure coupling the segments to the shaft for collective rotation at a selected speed within a locus or rotation reduced in diameter to define with the bore inner periphery (of greater diameter) a predetermined segment travel space; the coupler structure comprising a segment corresponding series of selectively openable lock assemblies locking the segments to the shaft, and clutch means on the several lock assemblies in centrifugal force-responsive relation to open all the lock assemblies and release together the striker segments in these series; each lock assembly comprising a first pin movable in a fixed circular path about the shaft and a second pin movable in a circular or sequentially curvilinear path relative to the shaft and with the striker segment, the first and second pins having selectively releasable interengagement controlling de-coupling of the segments from the shaft; the clutch means comprising a clutch rotor structure and a clutch collar blocking opening of the lock assemblies in the first angular orientation and permitting their opening in a second, angularly displaced orientation, the clutch rotor structure including a rotor element fixed to the shaft and a captive fluid reservoir, the reservoir fluid being selectively displaceable responsive to centrifugal force pressurization in rotor element and clutch collar relative angular orientation controlling relation; each lock opening releasing its locked segment in timed relation to release of all other lock segments and along separate angular paths through the travel space oriented by the segment portions sliding in the guide means for vertically multiple and circularly simultaneous compressional impact against the bore inner periphery, in dragging relation to set up the longitudinal and shear waves at relative amplitudes determined by the relation of the predetermined travel space selected rotational speed, and segment areal mass.

There is thus provided, in accordance with the invention, a system for generating and measuring in situ in a zone of earth surrounding a bore hole longitudinal and shear waves of predetermined relative amplitude, comprising, in combination, the apparatus just described, and wave measurement means, including wave sensors placed in the earth around the bore hole in wave-sensing relation.

The invention further contemplates method of generating longitudinal and shear waves of controllable relative amplitude, around a bore hole in the earth including releasing angularly against the bore inner periphery at a selected rotational speed a circular series of strikers in momentum-arresting relation, and varying the travel distance of the strikers from their locus of release and relative to the selected speed to correspondingly vary the amplitude of the shear wave relative to these longitudinal waves for the selected speed of rotation, and striker areal mass.

In a specific use of the present invention, there is provided method of identifying the location beneath the earth of oil sands and other fluid-like materials characteristically poorly propagating of shear waves, which includes generating a sub-surface disturbance in the expected vicinity of the oil sands or other fluid-like material by releasing angularly against the inner periphery of a bore hole drilled in the test area a circular series of strikers in momentum-arresting relation to generate longitudinal and shear waves, differentially sensing the relative propagation of the longitudinal waves and the shear waves through the test area, and identifying areas preferentially propagating longitudinal waves over shear waves, to locate the oil sand or other fluid-like material beneath the earth.

BRIEF DESCRIPTION OF THE DRAWINGS

The invention will be further described as to particular embodiments in conjunction with the attached drawings in which:

FIG. 3 is a view taken on line 3—3 in FIG. 2 and generally showing in elevation the coupler structure and in section the striker element and guide ring;

FIG. 4 is a view taken on line 4—4 in FIG. 2, generally showing another portion of the striker element and associated coupling and guiding structure;

FIG. 6 is a full view, generally in section, of the apparatus taken at the plane of FIG. 4;

FIG. 7 is a view through the clutch structure of the apparatus taken at line 7—7 in FIG. 2;

FIG. 8 is a view taken through interengaged coupler structure pins at line 8—8 in FIG. 2;

DESCRIPTION OF THE PREFERRED EMBODIMENTS

As will be evident from a consideration of the following description of one embodiment of the invention apparatus, the subterranean rotation of a series of mass elements does not require a large amount of power, since rotational speed may be built up gradually, and that tremendous loadings of the earth are realized by the circumferentially simultaneous impact of the mass elements. High loadings, e.g. of 1000 psi. are realizable with the illustrated device. Such loadings are in the explosive device range, while still higher stress loadings are obtainable using other embodiments of the invention principles herein set forth, but are realized herein without explosives. Additionally, by varying the travel distance for the mass elements more or less angular momentum is generated, enabling more or less shear wave generation and correspondingly less or more longitudinal wave generation, a feat not obtainable with explosive devices. Moreover, varying the masses and surface areas of the elements relative to each other to fix the impact factor termed "areal mass," provides wide-ranging and sensitive control of the relative amplitudes of shear and longitudinal wave pulses generated in the earth and their half-widths as well.

Figure 1:
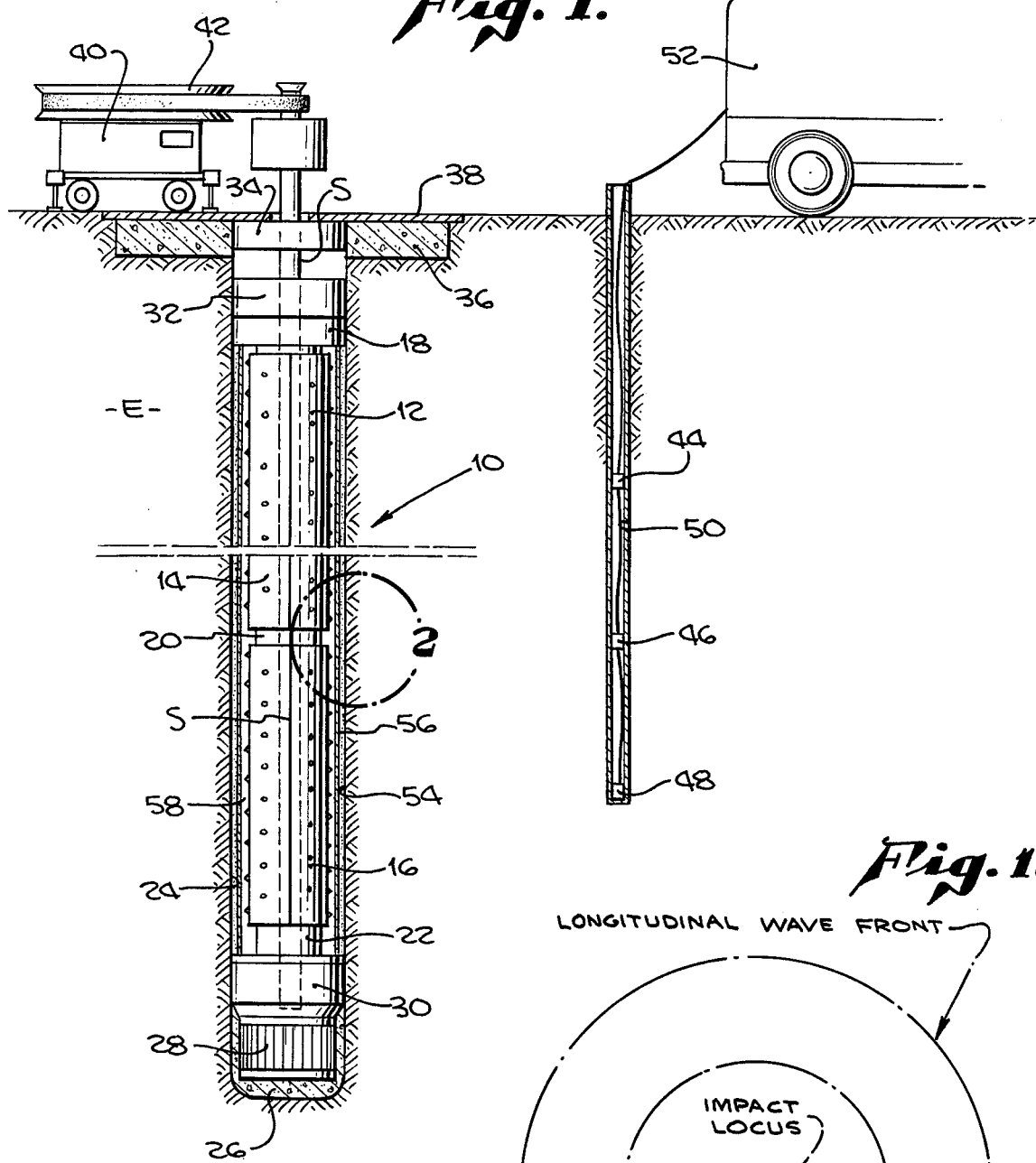
FIG. 1 is a view of the earth stress wave generation, sensing and measurement system according to the invention, depicting in elevation within a bore hole section, the earth stress wave generator apparatus installed for use, and the adjacent sensing and measurement apparatus.

With reference now to the drawings in detail, in FIG. 1 the stress wave generator according to the invention is depicted at 10 comprising upper, middle and lower cylindrical strikers 12, 14 (each shown partially), and 16 which are typical of the multiple stacked strikers which may be used to obtain the desired stress wave generation. An illustrative striker can supply the energy equivalent of 15 pounds of TNT; thus three strikers may supply 3 × 15 or 45# TNT equivalent. The striker cylinders are provided with clutch devices, e.g. as indicated at 18, 20 and 22 for purposes to appear. As will be noted, the striker cylinders 12, 14, 16 etc., and their associated clutch devices 18, 20, 22, etc., are carried on rotatable shaft S by means to be described, and the resultant assembly comprising the stress wave generator 10 is placed coaxially in bore hole 24 in the earth E, the hole being previously prepared with concrete pad 26 supporting lower shaft bearing 28 and base 30. The length of the bore hole 24 is to be determined by the intended stress generation location and the number of striker cylinders 12, etc. needed; a typical cylinder may be about 6 feet in length. Additional bearings are provided at 32 above the stress wave generator 10, the shaft S being supported by an upper bearing 34 anchored in the concrete pad 36 which surrounds the upper bearing; this arrangement being protected by cover plate 38. A prime mover is provided such as a gasoline engine 40 having a rotary power take-off belt and pully arrangement 42 for rotating the shaft at high speeds, e.g. 300 to 3,000 RPM and higher. It is a signal advantage of the present apparatus that a relatively small drive engine may be used since the needed rotational energy may be built up slowly and the load is small relative to the work finally accomplished.

Figure 2:
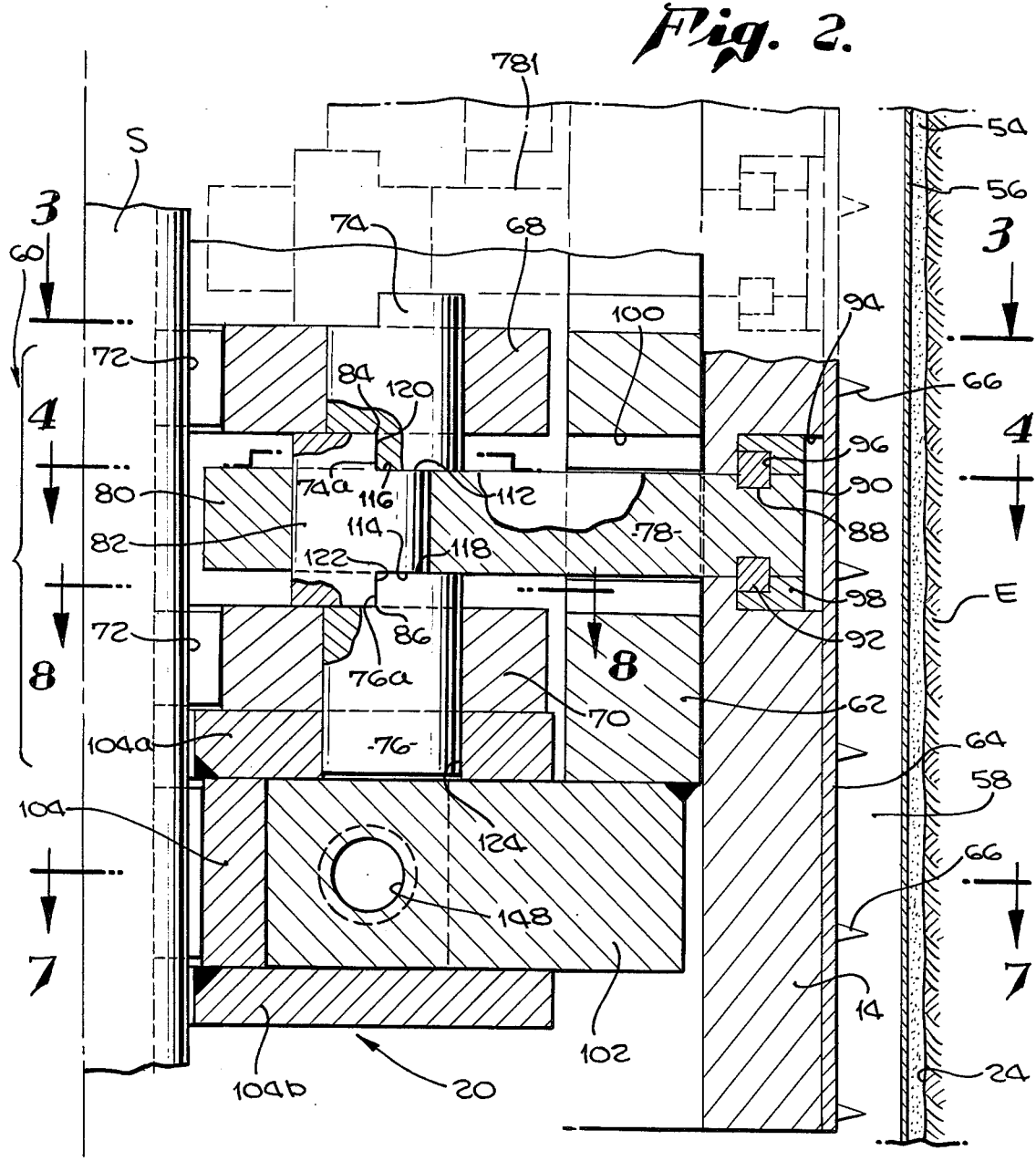
FIG. 2 is a view in vertical section, taken along line 2, of adjacent, opposed portions of two strikers according to the invention and the clutch therebetween.

Apparatus for sensing wave propagation of both longitudinal and shear waves and differentially is provided by sensors 44, 46, 48 in side bore hole 50, suitably electrically connected to measurement apparatus in van 52. The sensing, measuring and recording apparatus useful with the stress wave generator is known per se. The bore hole 24 is lined with a hydraulic setting material, cement, sand, grout or the like backing 54 for a thin, very smooth liner shell 56 of e.g. metallic or plastic self-supporting foil, circumferentially of the stress wave generator 10 to define a controlled dimension space 58 between the generator and the inner periphery as lined of the bore hole as best shown in FIG. 2. The purpose of the controlled dimension spacing 58 is to predetermine the travel distance for the striker segment flight, when released, as will be described.

The purpose of the described stress wave generator is the production of longitudinal and shear wave-inducing impact of multiple elements having some appreciable mass circularly about the inner periphery of a bore. To accomplish this purpose the striker elements are launched under great centrifugal force toward the bore periphery across the space between their locus of rotation and the periphery thus travelling angularly until impact. It is a signal feature of the invention that the resultant impact arrests the angular momentum of the striker element, an effect heightened by the increased strength of the bore wall (and liner where provided) in compression, and the momentary dragging of the striker element along the bore wall, transmitting tremendous torque to the surrounding medium as the multiple elements circularly contact the bore wall, at all points virtually instantaneously.

Many structural features of the apparatus, including simultaneous release mechanisms for the striker, symmetry of parts and bore hole for uniformity of flight distances and centrifugal force responsive means for initiation of release are directed to ensuring the appropriate timing of release for desired wave generation effect and the due execution of the release at the appropriate time.

Thus and with reference now to FIGS. 2-11, the construction and operation of the stress wave generator will be described. As previously mentioned, the stress wave generator has several component parts: the segmented striker cylinder, e.g. cylinder 14 in FIGS. 1 and 2; the clutch device, e.g. clutch 20 in FIGS. 1 and 2; the coupler structure indicated generally at 60 in FIG. 2, and the guide ring 62 shown in FIG. 2, which cooperates with portions of the coupler structure to guide the striker segments in flight.

Initially considering FIGS. 2, 4 and 6, the striker cylinder 14 is formed of a suitable metal and comprises three equal weight, arc-shaped segments 14a, 14b and 14c. Laminated or otherwise fastened to the respective segment convex surfaces are jackets 64 carrying in vertical and horizontal distributed relation a plurality of pointed projections 66 in the nature of prongs which together define a caltrops structure, suitably sloped rearwardly relative to the direction of rotation (shown counterclockwise — see arrow, FIG. 6). As will be further described later in reference to FIG. 10, these projections 66 penetrate the bore liner shell 56, liner 54 and the wall of bore 24.

The weight of the striker elements, segments 14a-c, is a controllable variable in the construction of the invention device. The weight selected, and the surface area provided for earth engagement, define for a given velocity an impact factor herein referred to as "areal mass," that is the impact is variable by varying the segment weight relative to the segment surface, and vice versa. The selection of the areal mass enables a variation in the duration and relative amplitudes of longitudinal and shear waves. In this context all parts of the apparatus carried with the segment, as described hereinbelow, are factored into a delineation of the areal mass figure.

The striker segments 14a-c are retained in place on the shaft S by coupler structure 60 without rigid interconnection where they abut. The coupler structure 60 for each arm includes one or more assemblies, depending on the vertical extent of the segment, of upper and lower rotor pin retainers 68, 70 centered on the shaft S in keyed relation at 72, and carrying respectively upper and lower rotor pins 74, 76; a striker arm 78 carrying at its inner end 80 a striker pin 82 engaged above and below at 84 and 86 respectively with the upper and lower rotor pins, as shown, and carrying in groove 88 at its outer end 90 fastener 92 engaged oppositely with the bottom wall of segment recess 94 and the shoulder 96 of retainer 98 in the recess. The striker arm 78 extends through journal 100 in guide ring 62 in axially sliding relation, for purposes of maintaining the angular orientation of the striker segment 14 during outward travel, as will appear. The clutch collar 102 of clutch 20 is coupled to the shaft S by a hydromechanical clutch device 104 to be described.

Thus, the apparatus 10 includes one or more multiples of a circular series of striker segments 12, 14, 16, FIG. 1. Each striker segment is supported on the shaft S by one or more vertically arranged coupler structures 60. Each coupler structure 60 includes the horizontal upper and lower rotor pin retainers 68, 70 carrying respectively upper and lower vertically disposed rotor pins 74, 76. A horizontal striker arm 78 is sandwiched between the upper and lower rotor pin retainers 74, 76 and itself carries a vertical striker pin 82 which engages both the upper and lower rotor pins, the striker arm extending slidably through guide ring 62 and into the striker segment recess 94 in retaining relation whereby the striker segment is maintained at its radial position delivering the segment's centrifugal load to the rotor pin retainers, the retainers being keyed to the shaft S as described.

Figure 5:
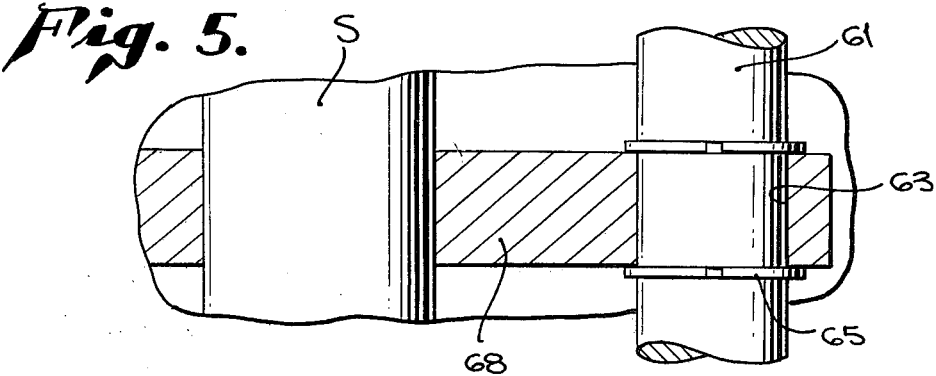
FIG. 5 is a view taken on line 5—5 in FIG. 3 and somewhat enlarged, showing the shaft and reinforcement rod aspects of the apparatus.
Figure 9:
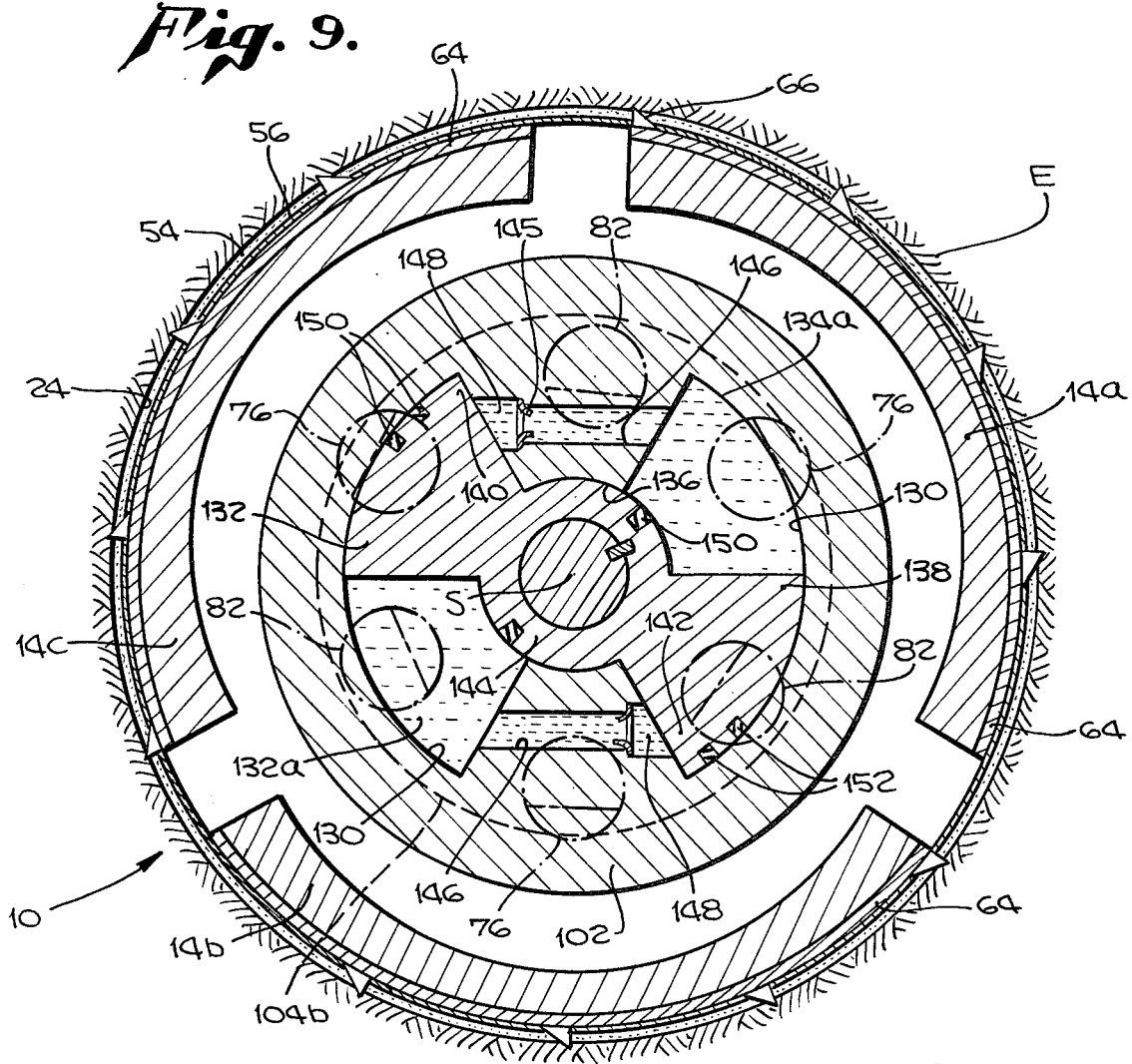
FIG. 9 is a view, somewhat enlarged, like FIG. 7 showing the apparatus following release of the striker elements to and their impact against the bore inner periphery.
Figure 11:
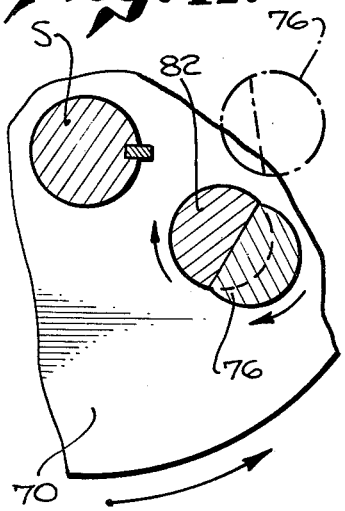
FIG. 11 is a fragmentary view depicting the rotation of coupler structure pins for release of the striker elements.

When the shaft S is rotated by the prime mover, engine 40, the several segments 14 are rotated. Centrifugal force is generated on the segments 14 but these segments do not fly out. Flight of the segments 14 is normally blocked by the coupler structure until release of the segments is desired, i.e., when the rotational speed thereof is optimum for the stress wave generation desired, given the dimensions of clearance space 58 which is fixed once the generator 10 is installed in the bore hole 24. Overall torsional rigidity is lent to the generator 10 by provision of stiffening means, e.g. framing or circularly spaced stiffening rods 61, passing through hole 63 in disc 68 and secured there by snap rings 65, as best seen in FIG. 5.

The coupler structure components have been identified. Their geometric relationship is, as depicted in the drawing, that upper and lower pins 74, 76 are coaxial with one another and parallel to the shaft S axis of rotation. Each of pins 74, 76 is provided with a chordal flat 74a, 76a respectively formed along a chord of the circular cross section of the pin and opposite the striker pin 82, the flat extending along the upper and lower pin in a manner to provide cooperating horizontal shoulders 112, 114 for engagement with the opposing horizontal shoulders 116, 118 of the striker pin. The striker pin 82 is radially offset inward from the upper and lower pins 74, 76, and paraxial therewith (the axes of all these pins are parallel) and with the shaft S. Thus there is an upper and lower chordal flat 120, 122 formed on the striker pin 82 to engage the corresponding flats 74a, 76a as their respective horizontal shoulders 112, 114, 116 and 118 engage. The upper and lower pins 74, 76 simultaneously abut the striker arm 78 therebetween. As will be seen in FIG. 2, lower rotor pin 76 is journaled in bore 124 of the clutch rotor plate 104a and the upper rotor pin 74 is oppositely abutted with another striker arm 781 (shown only in phantom) to complete the rotor pin 74, 76 positioning. The rotor pins 74, 76 and striker pin 82 in the embodiment depicted in FIG. 2 are free to rotate in the manner of lock spindles on their respective axes. It will be evident that during rotation of the generator 10 the centrifugal force developed on the striker segment 14 will be transmitted through striker arm 78 to striker pin 82, thence to the rotor pins 74, 76, and ultimately to the rotor pin retainers 68, 70. Said retainers are keyed at 72 to the shaft S primarily for delivery of rotary power by the shaft to the rest of the structure. The pin flats 74a and 76a and the opposing flats 120, 122 define respectively the upper and lower locus 84, 86 of engagement force. The tendency of such engaged flats, assuming their pins are free to rotate, is to relieve themselves of the force by alining the plane of the engagement locus 84 and 86 with a radial plane of the generator 10, i.e. radial relative to the shaft S. It will be noted that the rotor pins 74, 76 when initially assembled (FIG. 2) leave the locus of engagement 84, 86 with the striker pin 82 not parallel to, but at an angle to, the radial plane from the shaft S that bisects the planar locus of pin engagement 84, 86. If the locus of pin engagement 84, 86 were alined in a radial plane relative to the shaft S, the retentive engagement relation of flats 74a and 76a against the opposing flats 120, 122 would not exist, and other factors permitting, the striker pin 82 being fixed to the segment 14 by arm 72 would pass beyond the rotor pins 74, 76 and permit the segment to move longitudinally from the shaft S.

In other embodiments hereof, the pins 74, 76, and 82 do not rotate but more relatively circularly away from each other to permit segment tangential movement.

It is a further signal feature of the present invention that all segments are released at the desired moment, relative to rotational speed, and all are released together for simultaneous, and individual, impact. In the embodiment depicted, said release of the segments is achieved by control of pin 74, 76 rotation and thereby the longitudinal movement of the segments 14. Control of the rotor pin 74, 76 action relative to striker pin 82, for all coupler 60 structures together in a given circular series of segments is achieved by the use of a clutch having a hydromechanical nature enabling effective driving of the generator, release dependent on realization of desired rotational speed, and simultaneous though simple release couplings between the clutch and striker-coupler assemblies.

In general, the function of the clutch 20 is normally to block rotation of pins 74, 76 until the desired speed of rotation is obtained and then to immediately unblock these pins whereby the pins rotate on their axes to relieve centrifugal force thereon, release the striker pin 82 and permit the striker arm 78 to move outward, launching the striker segment 14 for travel angularly through measured annular space 54 and dragging impact against the bore hole 24 periphery.

With particular reference to FIG. 7, the clutch component includes: the clutch collar 102 already mentioned, generally circular with a specifically configured center opening 130 having axially opposed double lobe shaped openings 132, 134 on either side of a central bore 136; a clutch rotor element 104 having axially opposed lobes 140, 142 between clutch plates 104a (FIG. 2), 104b, defined on ends 138 on either side of a hub 144 fixed to the shaft S, and sealably journaled in the collar bore 136 and perimetrically to the center lobe openings 132, 136 by seals 150, 152. The clutch element lobes 140, 142 are sized and shaped, as shown in FIG. 7, to be received within the collar double lobe shaped openings 132, 134 in either of two circularly alternate positions. Initially the lobes 140, 142 are arranged in one half of the double lobe openings 132a, 134a as shown in FIG. 7; the opposite halves 132b, 134b of the double lobe openings are filled with fluid 146, suitably incompressible, such as water or the like. On rotation of the generator 10 the rotor element 104 is rotated by the shaft S, the clutch collar 102 in turn is rotated by the rotor element 104. Backlash of the clutch collar from its first angular orientation (FIG. 7) relative to the rotor element (the shaft, coupler structures and striker segments as well) is prevented by the presence of the fluid 146 in the 132b, 134b halves of each clutch collar lobe opening. The clutch assembly further includes, open to the lobe portions 132b, 134b containing the fluid 146, a wall portion which will rupture when subjected to a designated pressure. Thus, with reference to FIGS. 7 and 8, a rupturable diaphragm 145 formed of a suitably frangible light metal or the like to be controllably rupturable is provided in pressure communication with each of the fluid filled lobe openings 132b, 134b. Upon increasing the rotational speed, the pressure on the fluid 146 increases until the diaphragm 145 bursts, emptying the fluid into passage 148 and permitting clutch collar 102 and rotor element 104 to move to a second, different angular relation, the fluid being displaced through the passage into the portions of the lobe openings 132a, 134a just vacated by the rotor element lobes 140, 142, the lobes having reoriented themselves in response to the drop in fluid pressure. See FIG. 8. Displacement of the fluid and clutch rotor element 104 relative to the collar unbinds, e.g. the lower rotor pin 76 from its original position, (recalling from FIG. 2 that this rotor pin was carried in a bore 124 in the clutch plate 104a) unblocking the pin from its initial bound non-radial locus engagement with the striker pin 82, permitting the rotor pin 76 to rotate on its axis, and thus the striker pin 82 to rotate on its axis in pin-passing relation. See FIG. 11.

The result of the sudden, pressure responsive angular reorientation of the rotor element anc clutch collar is thus to free the striker arm 78 to move outward under centrifugal force.

Figure 10:
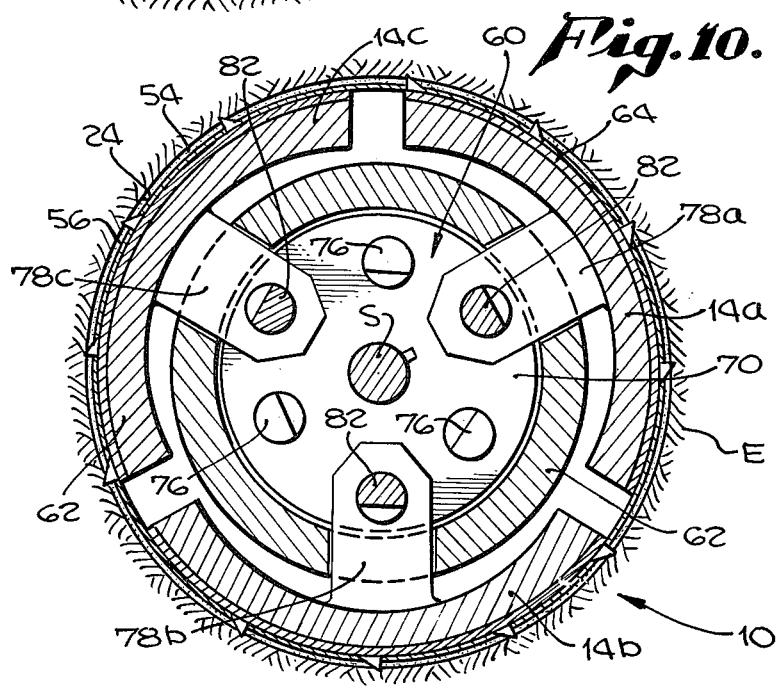
FIG. 10 is a view like FIG. 6, showing the arrangement of parts following release of striker elements and their impact with the bore inner periphery.

It is accordingly appropriate to turn our attention to the result of such striker arm movement. It will be recalled that the striker arm 78 supported the striker segment 14 in position vertically relative to the shaft S, while guide ring 62 maintained the relative angular orientation of the striker segment. With reference to FIGS. 6 and 10, which are before and after segment 14 release respectively, it will be seen that the striker arm 78 and its striker pin 82 move outward under centrifugal force until the striker segment impacts the shell 56, liner 54 and the bore hole 24, the projections 66 penetrating to the earth E. (See FIG. 10.) It will further be observed that segment 14a is angularly advanced in FIG. 10, relative to its position in FIG. 6, for purposes of illustration here, by about 30°. Nonetheless, the companion striker segments 14b, 14c are still in the same angular relation to striker segment 14a. The guide ring 62 accordingly serves to maintain the relative angular orientation of the striker segments, by controlling the angular orientation of the striker arms 78a, b, c, despite the separation of the striker arm 78, and striker segments 14 from the shaft S.

Figure 12:
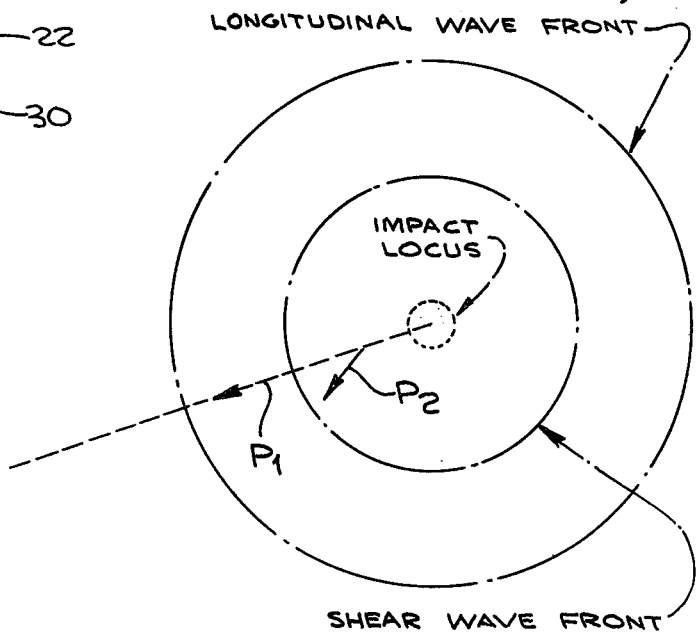
FIG. 12 is a schematic view depicting the separate longitudinal and shear wave fronts and the individual directions of particle motion thereof.

The effect of the impact obtained is shown schematically in FIG. 12. The longitudinal wave pulse $P_1$ passes more rapidly through the earth than the vectored shear wave, pulse $P_2$, producing two distinct wave fronts characterized by differently directed and measurable particle motions, as will be useful in oil sand exploration, for example, and which of course subject the earth under test to different stresses, providing thereby additional dimensions to earth testing.

We claim:

1. Apparatus for generating in situ in a zone of earth surrounding a bore hole longitudinal and shear waves of predetermined relative amplitude, said apparatus comprising a striker having plural individually separable mass elements collectively rotatable at a selected speed within a locus of rotation coaxial with the bore and inward from the bore inner periphery to define a mass element travel space predetermined in relation to said selected rotational speed; means to separate said mass elements from said locus at said selected speed to travel centrifugally outward through said space in timed response to striker rotation and angularly impact said periphery in circularly distributed dragging relation generating longitudinal and shear waves having predetermined relative amplitudes responsive to said relation of travel space, rotational speed, and element areal mass.

2. Apparatus according to claim 1 in which said striker comprises a cylinder coaxial with said bore hole, said cylinder being longitudinally segmented to define said mass elements.

3. Apparatus according to claim 1 including also a shaft extending within said locus supporting said striker in driving relation.

4. Apparatus according to claim 1 in which said mass element separating means is responsive to centrifugal force at said selected speed to separate said mass elements.

5. Apparatus according to claim 1 including also bore hole liner means circumferentially enclosing said striker in spaced relation and uniformly defining said mass element travel space thereby for simultaneous element impact.

6. Apparatus according to claim 1 including also surface projections carried by said mass elements for bore inner periphery engagement in drag-enhancing relation.

7. Apparatus according to claim 1 in which said mass elements are supported on a common shaft and independent of their adjacent elements.

8. Apparatus according to claim 1 including also a guide ring maintaining the relative angular orientation of said segments during travel through said space.

9. Apparatus according to claim 1 including also an earth surface located prime mover coupled to said striker in rotationally driving relation.

10. Apparatus for generating in situ in a zone of earth surrounding a bore hole longitudinal and shear waves of predetermined relative amplitude, said apparatus comprising a striker having plural, separable, longitudinal elements; and coupler structure coupling said segments for rotation collectively at a selected speed within a reduced locus of rotation coaxial with the bore defining a segment travel space between said locus and the bore inner periphery, said space being predetermined in relation to said selected rotational speed; said coupler structure including means releasing said segments in timed relation to striker rotation at said selected speed centrifugally outward and each along an individual path angularly outward through said space to compressionally impact said bore inner periphery in circularly distributed dragging relation to generate longitudinal and shear waves having predetermined relative amplitudes responsive to said relation of travel space, rotational speed and segment areal mass.

11. Apparatus according to claim 10 including also a shaft extending along the locus axis of rotation, said coupler structure coupling said segments to said shaft for rotation.

12. Apparatus according to claim 10 in which said striker comprises a cylinder symmetrically longitudinally segmented to define uniformly sized segments.

13. Apparatus according to claim 12 in which said striker segments are peripherally transversely arcuate.

14. Apparatus according to claim 11 including also projections carried by said segments outward in drag-enhancing relation.

15. Apparatus according to claim 11 including also a segment guide maintaining the relative angular orientation of said segments during their travel angularly outward through said space.

16. Apparatus for generating in situ in a zone of earth surrounding a bore hole longitudinal and shear waves of predetermined relative amplitude, said apparatus comprising a striker having plural, separable, longitudinal segments; and coupler structure coupling said segments for rotation collectively at a selected speed within a reduced locus of rotation coaxial with the bore defining a segment travel space between said locus and the bore periphery, a shaft extending along the locus axis of rotation, said segments being coupled to said shaft by said coupler structure, said segment travel space being predetermined in relation to said selected rotational speed, said coupler comprising a selectively openable lock assembly locking the striker elements to said shaft, clutch means acting on the lock assembly in centrifugal force responsive relation to open the lock assembly and release said striker segments in timed relation to striker rotation at said selected speed centrifugally outward and each along an individual path angularly outward through said space to compressionally impact said bore inner periphery in circularly distributed dragging relation to generate longitudinal and shear waves having predetermined relative amplitudes responsive to said relation of travel space, rotational speed and segment areal mass.

17. Apparatus according to claim 16 in which said lock assembly includes a first pin movable in a fixed circular path about the shaft and a second pin movable in a circular path and a sequentially curvilinear path with a striker segment, said first and second pins having selectively releasable inter-engagement controlling separation of said segment from the shaft.

18. Apparatus according to claim 17 in which said clutch means is hydromechanical and comprises a clutch rotor structure fixed to the shaft and a clutch collar, said rotor structure being selectively rotatable relative to the collar between first and second angular orientations to block or unblock respectively opening of the lock assembly in response to centrifugal force sensed at the speed of rotation selected.

19. Apparatus according to claim 18 in which said clutch rotor structure includes a rotor element fixed to the shaft and a captive fluid reservoir between the rotor element and the clutch collar, said reservoir fluid being selectively displaceable responsive to centrifugal force pressurization, in rotor element and clutch collar relative angular orientation controlling relation.

20. Apparatus according to claim 19 including also means releasing said captive fluid from said reservoir, said fluid release means being responsive to centrigual force pressurization of said fluid.

21. Apparatus according to claim 20 in which the fluid release means comprises a frangible wall in pressure sensing relation to said fluid and rupturing responsive to sensing the centrifugal force pressurization of said fluid at said selected rotational speed, to free the fluid, releasing said pins, otherwise locked, from their interengagement and said striker segments thereby for travel through said space with said clutch collar then driving said clutch rotor element in its second angular orientation.

22. Apparatus according to claim 18 in which said pins have circular motion about said shaft and are circularly separable to disengage responsive to angular reorientation of said clutch rotor element to the second angular orientation relative to said clutch collar.

23. Apparatus according to claim 18 in which said pins are paraxial with each other and said shaft and have planetary motion about said shaft, said pins being radially separable to disengage responsive to angular reorientation of said clutch rotor element to the second angular orientation relative to said clutch collar.

24. Apparatus according to claim 23 in which said first and second pins are radially and vertically offset, and including also respectively opposed chordal flats formed on said pins to define their mutual interengagement surfaces, said pins having relative movement upon alinement of said interengagement surfaces in a radial plane relative to the shaft, said pins tending to aline their interengagement surfaces along said radial plane responsive to striker rotation upon angular reorientation of said clutch rotor element to said second angular orientation thereof relative to said clutch collar.

25. Apparatus according to claim 24 in which said clutch includes a rotor element fixed to the shaft and a captive fluid reservoir between the rotor element and the clutch collar, said reservoir fluid being selectively displaceable responsive to centrifugal force pressurization in rotor element anc clutch collar relative angular orientation controlling relation.

26. Apparatus according to claim 25 including also means releasing said captive fluid from said reservoir, said fluid release means being responsive to centrifugal force pressurization of said fluid.

27. Apparatus according to claim 26 in which the fluid release means comprises a frangible reservoir wall in pressure sensing relation to said fluid and rupturing responsive to sensing increased fluid pressure at the selected rotational speed, to free the fluid, unblocking said pins to rotate on their own axes to aline their mutual interengagement flats in a radial plane relative to the shaft, releasing the pins from their interengagement and said striker segments thereby for travel through said space to the bore inner periphery.

28. Apparatus according to claim 17 including also circular series of said first and second pins and accompanying striker segments in stacked array, said pins and segments being jointly responsive to said clutch means reorienting operation.

29. Apparatus according to claim 28 in which said striker comprises a vertical series of cylinders, each symmetrically longitudinally segmented in common planes to define circularly arranged vertical stacks of symmetrical striker segments, and including also a corresponding vertical series of segment guide rings maintaining the relative angular orientation of said segments during their travel angularly outward through said space.

30. Apparatus according to claim 29 including also a series of surface distributed projections on said striker elements in drag-enhancing relation.

31. Apparatus for generating in situ in a zone of earth surrounding a bore hole longitudinal and shear waves of predetermined relative amplitude, said apparatus comprising a bore coaxial shaft, a vertical series of strikers, each said striker having plural, like, separable, longitudinal segments; segment guide means receiving segment portions in radially sliding relation; coupler structure coupling said segments to the shaft for collective rotation at a selected speed within a locus of rotation reduced to define with the bore inner periphery a predetermined segment travel space; said coupler structure comprising a segment corresponding series of selectively openable lock assemblies locking the striker segments to the shaft, and clutch means acting on the several lock assemblies in centrifugal force-responsive relation to open all the lock assemblies and release together the striker segments in said series; each said lock assembly comprising a first pin movable in a fixed circular path about the shaft, and a second pin movable in a circular or sequentially curvilinear path relative to the shaft and with a striker segment, said first and second pins having selectively releasable interengagement controlling de-coupling of the segments from the shaft; said clutch means comprising clutch rotor structure and clutch collar blocking opening of the lock assemblies in a first angular orientation and permitting their opening in a second, angularly displaced orientation, said clutch rotor structure including a rotor element fixed to the shaft and a captive fluid reservoir, said reservoir fluid being selectively displaceable responsive to centrifugal force pressurization in rotor element and clutch collar relative angular orientation controlling relation; each said lock opening releasing its locked segment in timed relation to release of all other locked segments and along separate angular paths through said travel space oriented by said segment portions sliding in said guide means for vertically multiple and circularly simultaneous compressional impact against the bore inner periphery in dragging relation to set up said longitudinal and shear waves at relative amplitudes determined by the relation of the predetermined travel space, selected rotational speed, and segment areal mass.

32. System for generating and measuring in situ in a zone of earth surrounding a bore hole longitudinal and shear waves of predetermined relative amplitude, comprising in combination, the apparatus according to claim 1, and wave measurement means including sensors placed in the earth around the bore hole in wave sensing relation.

33. Method of generating longitudinal and shear waves of controllable relative amplitude in the earth around a bore hole including releasing angularly against the bore inner periphery at a selected rotational speed a circular series of strikers in momentum-arresting relation, and varying the travel distance of said strikers from their locus of release and relative to said selected speed to correspondingly vary the amplitude of the shear waves relative to the longitudinal waves for said selected speed of rotation and striker areal mass.

34. Method of identifying the location beneath the earth of oil sands and other fluid-like materials characteristically poorly propagating of shear waves, which includes generating a sub-surface disturbance in the expected vicinity of the oil sands or other fluid-like material by releasing angularly against the inner periphery of a bore hole drilled in the test area a circular series of strikers in momentum-arresting relation te generate longitudinal and shear waves, differentially sensing the relative propagation of the longitudinal and shear waves through the test area, and identifying portions of the area preferentially propagating longitudinal waves over shear waves to locate oil sands or other fluid-like material beneath the earth.

* * * * *